United States Patent [19]

Kokeguchi

[11] Patent Number: 5,316,333
[45] Date of Patent: May 31, 1994

[54] AIR BAG COVER MOUNTING HAVING ENGAGEMENT PORTIONS TO FACILITATE ATTACHMENT

[75] Inventor: Akira Kokeguchi, Shiga, Japan

[73] Assignee: Takata Corporation, Tokyo, Japan

[21] Appl. No.: 977,099

[22] Filed: Nov. 16, 1992

[30] Foreign Application Priority Data

Dec. 4, 1991 [JP] Japan .................. 3-320513

[51] Int. Cl.⁵ .................................... B60R 21/20
[52] U.S. Cl. ................... 280/728 A; 280/728 B
[58] Field of Search ........... 280/728 A, 728 B, 731, 280/732, 743 R

[56] References Cited

U.S. PATENT DOCUMENTS

| | | | |
|---|---|---|---|
| 3,966,227 | 6/1976 | Cameron | 280/752 |
| 5,022,676 | 6/1991 | Rogerson et al. | 280/743 |
| 5,058,919 | 10/1991 | Paquette et al. | 280/728 A X |
| 5,066,037 | 11/1991 | Castrigno et al. | 280/732 |
| 5,074,584 | 12/1991 | Jarboe | 280/728 A |
| 5,145,207 | 9/1992 | Bederka et al. | 280/728 A X |
| 5,167,427 | 12/1992 | Baba | 280/728 B |
| 5,201,541 | 4/1993 | Jones et al. | 280/731 |

FOREIGN PATENT DOCUMENTS

| | | | |
|---|---|---|---|
| 3544704 | 6/1987 | Fed. Rep. of Germany | 280/743 |
| 3545028 | 7/1987 | Fed. Rep. of Germany | 280/728 B |
| 3907538 | 9/1989 | Fed. Rep. of Germany | |
| 4128945 | 4/1992 | Fed. Rep. of Germany | |
| 4201372 | 7/1992 | Fed. Rep. of Germany | |
| 3182115 | 7/1988 | Japan | 280/728 B |
| 4090942 | 3/1992 | Japan | 280/728 B |
| 4151348 | 5/1992 | Japan | 280/728 B |
| 9200206 | 1/1992 | PCT Int'l Appl. | |
| 2236082 | 3/1991 | United Kingdom | 280/728 B |
| 2241663 | 9/1991 | United Kingdom | |
| 2246983 | 2/1992 | United Kingdom | |

Primary Examiner—Margaret A. Focarino
Assistant Examiner—Peter English
Attorney, Agent, or Firm—Kanesaka & Takeuchi

[57] ABSTRACT

An air bag device for passenger comprises a box-shaped container opened in a front face thereof, an air bag folded and contained in the container, an inflator attached to the container for inflating the air bag, a lid covering the front surface of the container, a lid mount bracket disposed along an upper surface of the container, a back-up plate constituting the lid, an upper portion of which extends rearward of the lid and constitutes a lid mounting portion secured to the lid mount bracket and an engaging device for engaging the lid mounting portion and the lid mount bracket so as to prevent the lid mounting portion of the back-up plate from forward movement relative to the lid mount bracket.

2 Claims, 8 Drawing Sheets

AIR BAG COVER MOUNTING HAVING ENGAGEMENT PORTIONS TO FACILITATE ATTACHMENT

BACKGROUND OF THE INVENTION AND RELATED ART STATEMENT

The present invention relates to an air bag device for a passenger disposed in a vehicle for expanding an air bag upon vehicle collision thereby protecting the passenger.

An air bag device for a passenger comprises a folded air bag and an inflator attached to a holding member, for example, a container, and a lid attached so as to cover the air bag. Upon vehicle collision, the inflator is actuated to extend the air bag. The lid is pushed by the inflating air bag and opens to the inside of a cabin, so that the air bag extends largely to the inside of the cabin thereby protecting an occupant.

FIG. 5 through FIG. 7 show an air bag device in the prior art, in which FIG. 5 is a schematic perspective view illustrating the entire constitution of the air bag before extension, FIG. 6 is a side elevational view and FIG. 7 is an enlarged perspective view.

In the air bag device 10, a lid 14 is attached in front of a box-shaped container 12 opened at its front. An inflator 16 is secured to the container 12. An air bag 18 is folded and inserted in the container 12 and fixed by bolts 19. A plurality of suction apertures 20 is perforated in an upper wall and a lower wall of the container 12 respectively. When the inflator 16 is actuated to jet out a gas into the container 12 and extend the air bag 18, atmospheric air flows through the suction apertures 20 and enters into the container 12 thereby rapidly extending the air bag 18.

The lid 14 comprises a back-up plate 22 made of an aluminum alloy or the like and a soft cover 24 disposed in front of the plate 22. The upper edge of the plate 22 constitutes a lid mounting portion 26 extended above the container 12.

A lid mount bracket 28 is secured to the upper surface of the container 12 by means of spot welding or the like. The lid mount bracket 28 extends along the upper surface of the container 12 and has a plurality of bolt apertures 30 perforated therein. A plurality of bolt apertures 32 is also perforated in the lid mounting portion 26, and the lid mounting portion 26 is secured by means of bolts 34 and nuts to the lid mount bracket 28.

As shown in FIG. 7, the rear face of the container 12 is concaved for receiving the inflator 16. Further, slits 36 are opened at the rear face for introducing the gas jetted out from the inflator 16 into the container 12. The inflator 16 is held by an inflator cover 38 to the container 12. The inflator cover 38 is secured by means of bolts 40 to the container 12. Reference numeral 42 denotes openings through which the bolts 40 pass.

When the inflator 16 is actuated to jet out the gas into the container 12 and the air bag 18 starts inflation, the lid 14 at first moves slightly forward by the air bag 18 as shown by the dotted chain 14a in FIG. 6 and then the back-up plate 22 deforms such that the lid 14 bends upwardly as shown by an arrow 14B.

When the air bag 18 is thus extended, the back-up plate 22 at first undergoes a forward force and an extremely large stress is exerted on the lid mounting portion 26.

The stress concentrates near the bolt apertures 32 that engage the bolts 34. Accordingly, it has been necessary for the portion in the vicinity of the bolt apertures 32 of the lid mounting portion 26 of the back-up plate 22 to be reinforced to have high strength. In addition, it has been necessary to dispose a plurality of bolt apertures 32 and secure by means of a plurality of bolts 34, which makes the assembling operation troublesome.

OBJECT AND SUMMARY OF THE INVENTION

An object of the present invention is to provide an air bag device for a passenger which is free from requirement for the above reinforcing mechanism and which can be assembled easily.

Another object of the present invention is to provide an air bag device for a passenger in which a lid can be supported firmly to the lid mount bracket.

The present invention provides an air bag device for a passenger comprising a box-shaped container opened in its front face, an air bag contained in the container, an inflator attached to the container, a lid covering a front face of the container, a lid mount bracket disposed along an upper surface of the container and a back-up plate constituting the lid whose upper portion extends rearward of the lid and constitutes a lid mounting portion secured to the lid mount bracket.

An air bag device for a passenger in the first aspect of the present invention comprises a hook formed by bending a rear edge of the back-up plate and engaged with the rear edge of the lid mount bracket.

An air bag device for a passenger in the second aspect of the present invention comprises a lid engaging hook protruded from the upper surface of the lid mount bracket and an engagement portion disposed to the lid mounting portion for engaging the hook portion.

In the air bag device for a passenger according to the first aspect of the present invention, the hook portion disposed to the lid mounting portion engages the edge of the lid mount bracket.

In the air bag device for a passenger according to the second aspect of the present invention, a hook disposed to the lid mount bracket engages the edge of an opening disposed to the lid mounting portion.

The hook strongly supports the lid when it is going to move forward, thereby inhibiting the lid from forward movement. Therefore, a locally large stress can be prevented from exerting in the vicinity of the bolt apertures of the lid mounting portion. Accordingly, it is no more necessary to provide a particular reinforcement near the bolt apertures of the lid mounting portion. Further, the number of bolts or rivets used for securing the lid mounting portion to the lid mount bracket can be reduced, to facilitate the assembling operation of the air bag device for a passenger.

PREFERRED EMBODIMENTS

Figure 1:
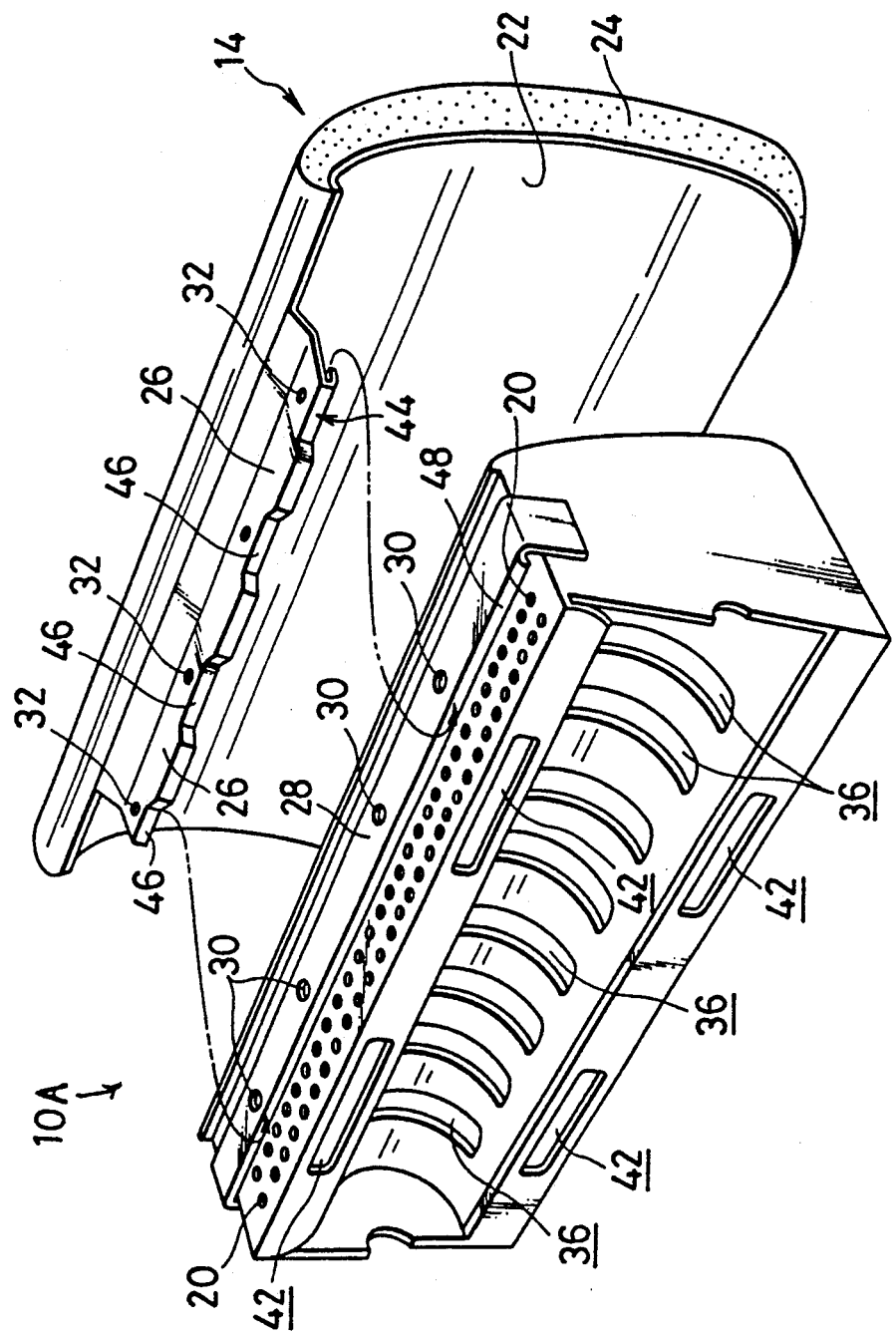
FIG. 1 is an exploded perspective view of an air bag device for a passenger according to a preferred embodiment of the present invention.
Figure 2:
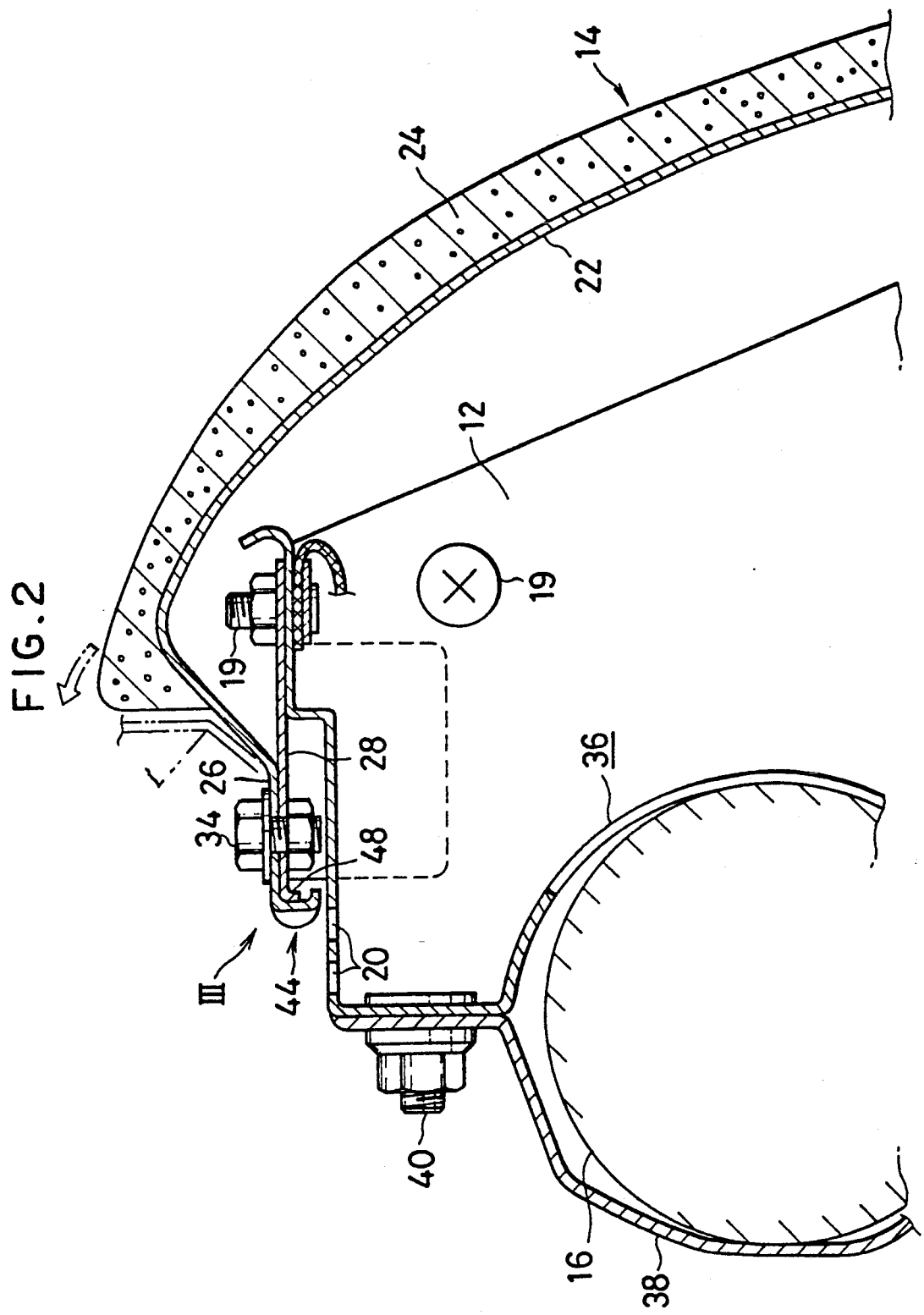
FIG. 2 is a vertical cross sectional view for an upper half of an air bag device for a passenger according to the preferred embodiment.
Figure 3:
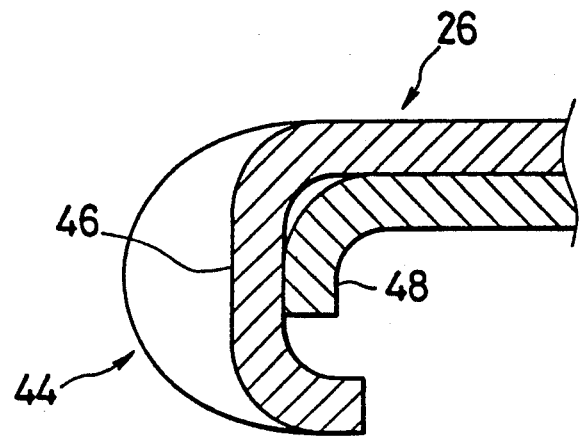
FIG. 3 is an enlarged view for a portion III shown in FIG. 2.

Description will now be made to the first embodiment of the present invention with reference to FIG. 1 to FIG. 3.

Figure 5:
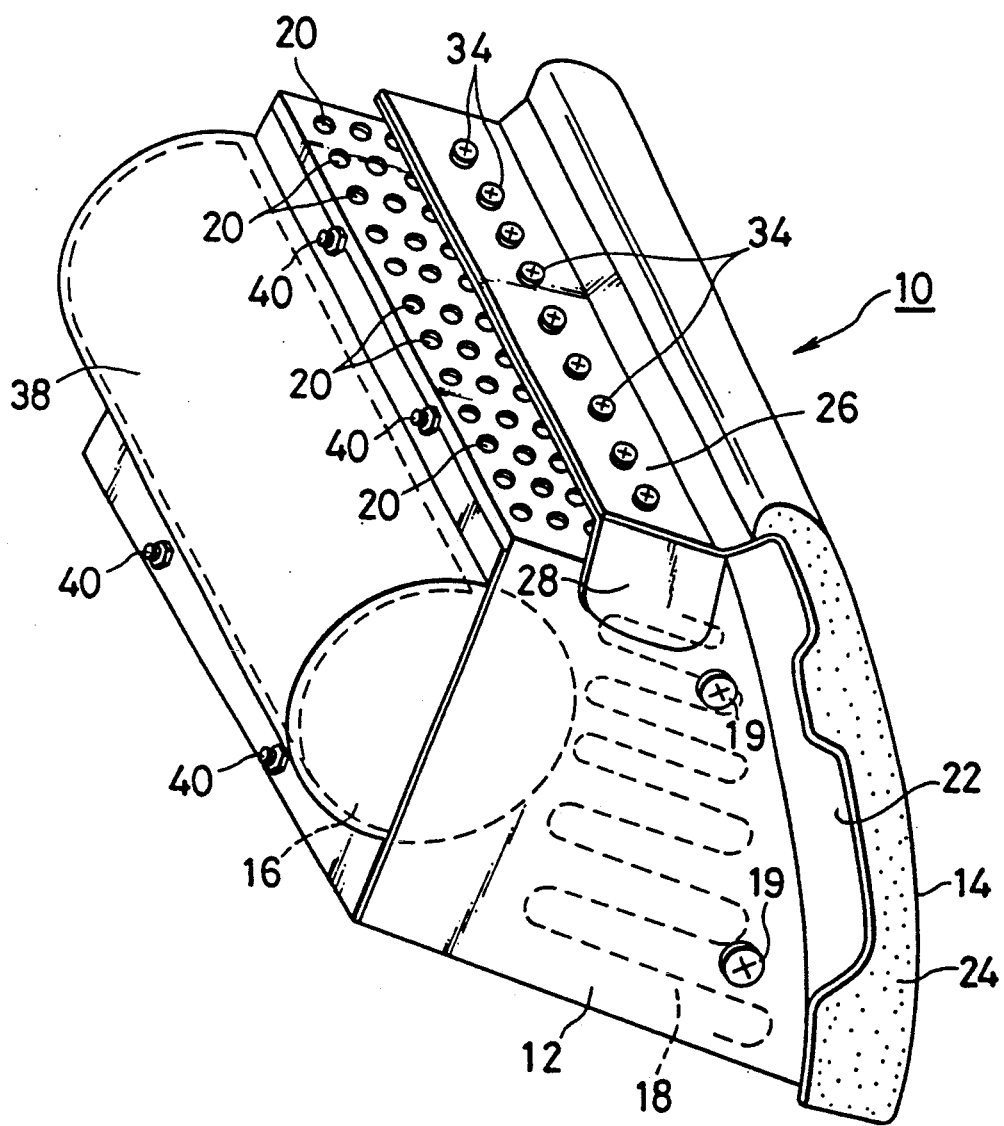
FIG. 5 is a perspective view of an air bag device for a passenger in the prior art.
Figure 6:
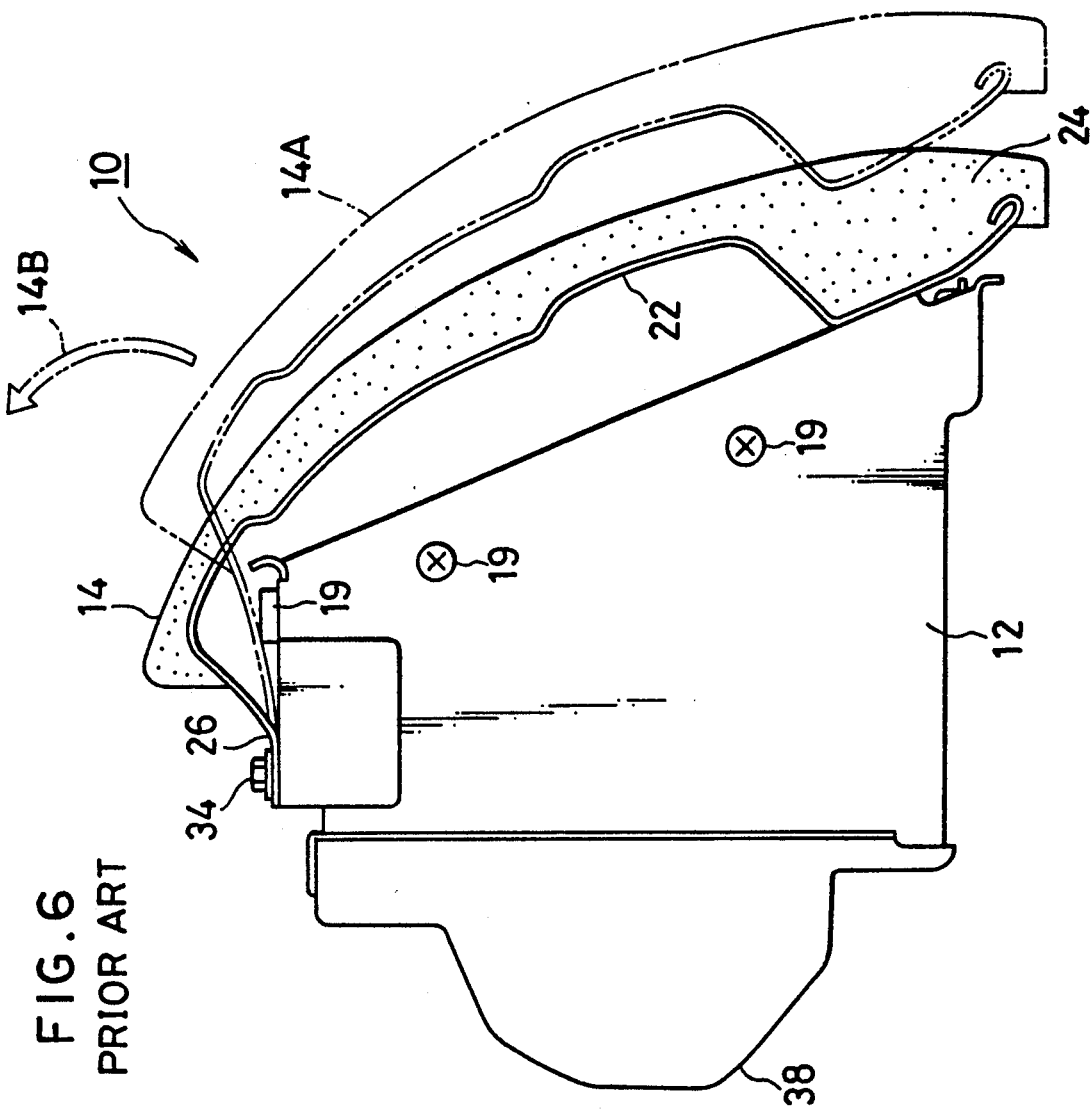
FIG. 6 is a side elevational view of the air bag device in the prior art.
Figure 7:
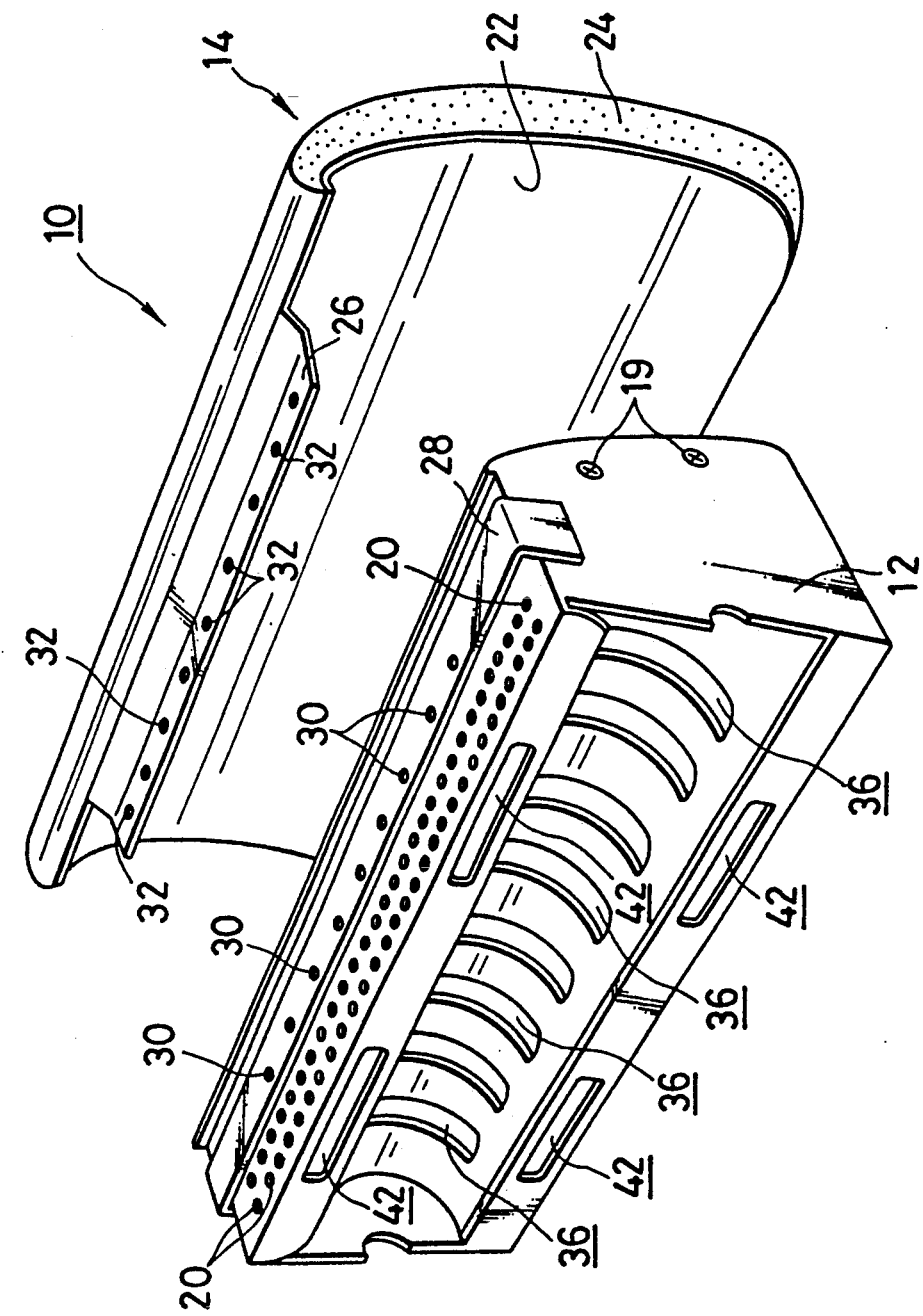
FIG. 7 is an enlarged view of the air bag device in the prior art.

In this embodiment, a rear edge of a lid mounting portion 26 of a lid 14 is bent into a J-shaped configuration to constitute a portion 44. In this embodiment, the hook portion 44 is applied with drawing procedure so as to define recesses 46 and the bending rigidity of the hook portion 44 is increased by forming the recesses 46. The hook 44 engages the rear edge of a lid mount bracket 28. The rear edge of the lid mount bracket 28 is bent downward in an L-shaped configuration to constitute a rib 48. In this embodiment, bolt apertures 30, 32 are perforated each by four. Other constitutions are the same as those shown in FIG. 5 to FIG. 7, in which identical portions carry identical reference numerals.

In the air bag device 10A of this embodiment thus constituted, the hook 44 disposed to the lid mounting portion 26 engages the edge of the lid mount bracket 28, and the hook 44 firmly supports the lid 14 when it is going to move forward, thereby inhibiting the lid from forward movement. Therefore, a locally large stress is prevented from exerting in the vicinity of the bolt apertures 32 of the lid mounting portion 26. Accordingly, it is no longer necessary to dispose any particular reinforcement in the vicinity of the bolt apertures 32 of the lid mounting portion 26. Furthermore, the number of bolts 34 and rivets for securing the lid mounting portion 26 to the lid mount bracket 28 can be reduced, thereby facilitating the assembling operation for the air bag device.

Figure 4:
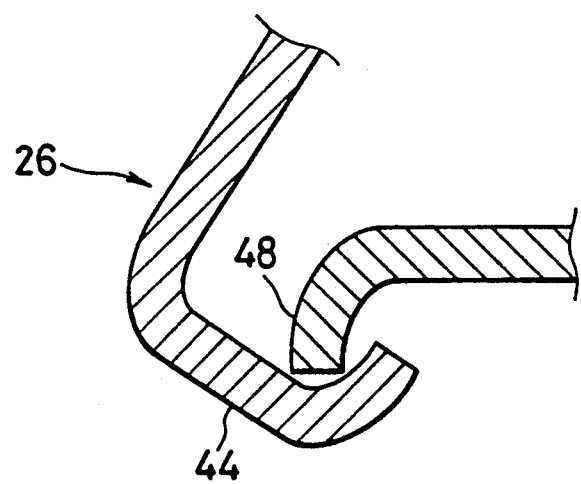
FIG. 4 is a cross sectional view for a portion illustrating the operation state of the air bag device.

In this embodiment, even when the air bag 18 inflates to bend the lid 14, since the J-shaped hook 44 is caught by the rib 48 as shown in FIG. 4, the lid 14 can be firmly supported by the lid mount bracket 28.

In this embodiment, the lid 14 can be supported surely only by the three bolts 34 as shown in the drawing.

Figure 8:
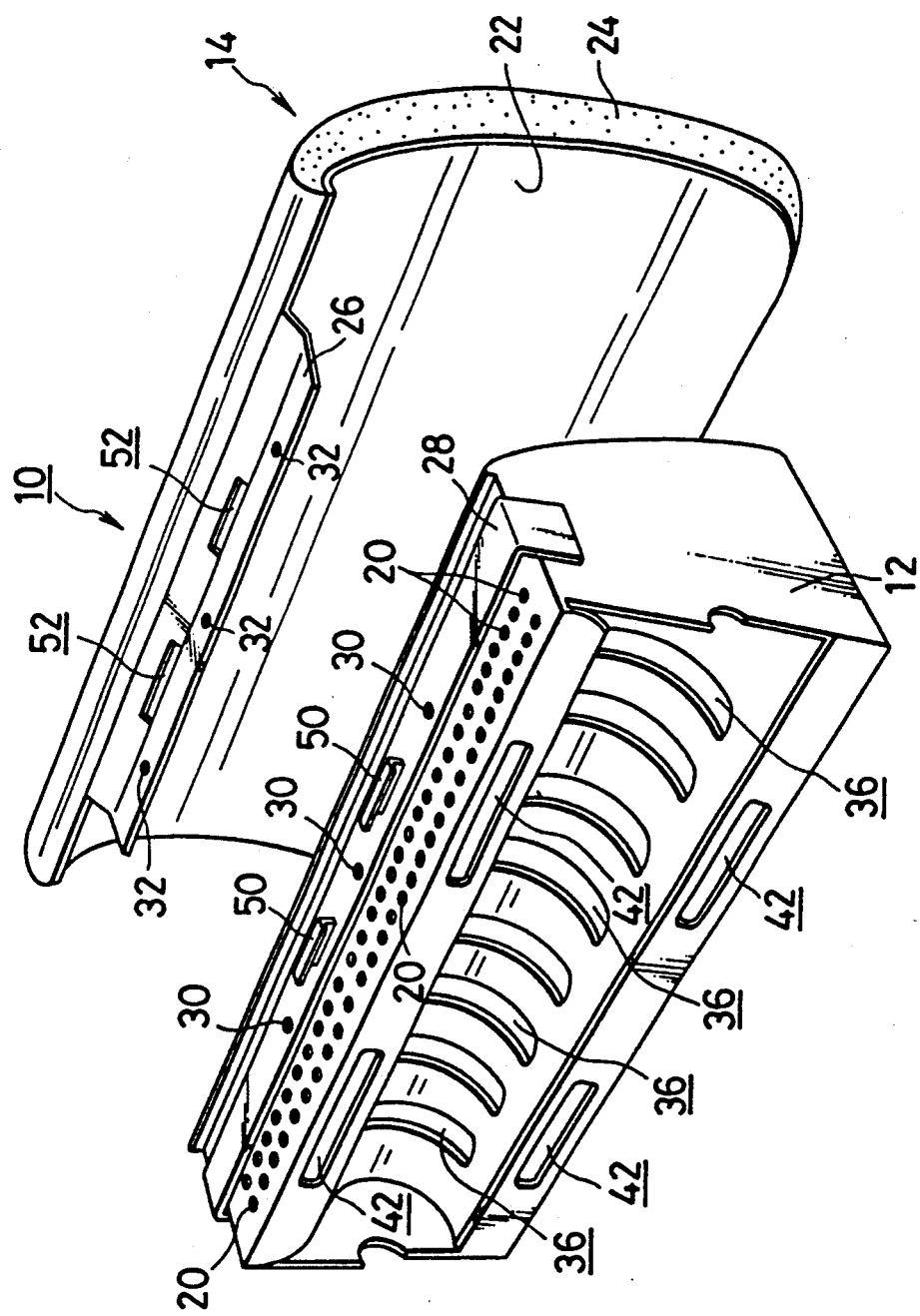
FIG. 8 is an enlarged perspective view of an air bag device for a passenger in another embodiment of the present invention.
Figure 9:
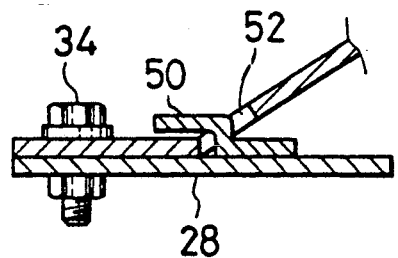
FIG. 9 is a cross sectional view for a portion of an air bag device for a passenger in the embodiment shown in FIG. 8.

FIG. 8 is an enlarged perspective view of an air bag device for a passenger and FIG. 9 is an enlarged cross sectional view for the hook thereof.

Figure 10:
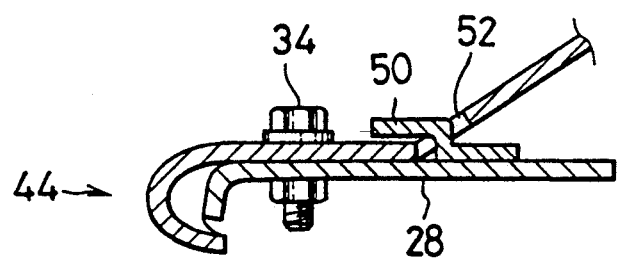
FIG. 10 is a cross sectional view for a portion of an air bag device for a passenger in a further embodiment of the present invention.

In this embodiment, hooks 50 are disposed vertically to an L-shaped lid mount bracket 28, and slits 52 are opened in the lid mounting portion 26 for catching the hooks 50. When the hooks 50 are engaged in the slits 52 to secure the lid 14 to the lid mount bracket 28, the lid 14 can be supported firmly to the container 12 in the same manner as in the previous embodiment. In the present invention, the hook 44 may be disposed to the lid mounting portion 26 and, further, the hook 50 may be disposed to the lid mount bracket 28 as shown in FIG. 10.

As has been described above in the air bag device according to the first aspect of the present invention, the hook disposed to the lid mounting portion engages the edge of the lid mount bracket. In the air bag device according to the second aspect of the present invention, the hook disposed to the lid mounting bracket engages the edge at the opening disposed in the lid mounting portion.

Since the hook firmly engages the lid, locally large stress can be prevented from exerting in the vicinity of the bolt apertures of the lid mounting portion. Accordingly, it is no longer necessary to provide any particular reinforcement near the bolt apertures of the lid mounting portion. Further, the number of bolts or rivets for securing the lid mounting portion to the lid mount bracket can be reduced to facilitate the assembly operation for the air bag device.

What is claimed is:

1. An air bag device for a passenger, comprising:
   a box-shaped container having an opening in a front side,
   an air bag folded and retained in the container,
   an inflator attached to the container for inflating the air bag,
   a lid mount bracket fixed to and extending along an upper surface of the container, said lid mount bracket having a rear edge located away from the opening of the container and a rib extending downwardly from the rear edge thereof,
   a lid for covering the opening of the container and having a back-up plate, said back-up plate having a front face for covering the opening of the container and a lid mounting portion integrally formed therewith as one unit, said lid mounting portion extending rearwardly from the front face and disposed above the lid mount bracket, said lid mounting portion having a rear edge,
   fixing means for immovably connecting the lid mounting portion to the lid mount bracket, and
   engaging means for engaging the lid mounting portion to the lid mount bracket to prevent the lid mounting portion from moving forwardly relative to the lid mount bracket when the lid is opened, said engaging means including a hook formed of a side portion extending along and projecting downwardly from the rear edge of the lid mounting portion and a flange formed at a bottom of the side portion and extending toward the front face of the lid to securely engage the hook to the rear edge of the lid mount bracket, said hook having a plurality of recesses along the rear edge of the lid mounting portion indented toward the front face of the lid to increase rigidity of the hook.

2. An air bag device for a passenger, comprising:
   a box-shaped container having an opening in a front side,
   an air bag folded and retained in the container,
   an inflator attached to the container for inflating the air bag,
   a lid mount bracket fixed to and extending along an upper surface of the container, said lid mount bracket having a rear edge located away from the opening of the container and a rib extending downwardly from the rear edge thereof,
   a lid for covering the opening of the container and having a back-up plate, said back-up plate having a front face for covering the opening of the container and a lid mounting portion extending rearwardly from the front face and disposed above the lid mount bracket, said lid mounting portion having a rear edge, fixing means for immovably connecting the lid mounting portion to the lid mount bracket, engaging means for engaging the lid mounting portion to the lid mount bracket to prevent the lid mounting portion from moving forwardly relative to the lid mount bracket when the lid is opened, said engaging means including a lid engaging hook protruding upwardly from an upper surface of the lid mount bracket and extending rearwardly from the opening along the rear edge of the lid mount bracket, and a slit formed in the lid mounting portion, said lid engaging hook, when the lid is assembled with the container, engaging the slit and being disposed above the lid mounting portion so that forward and upward movements of the lid is prevented when the lid is opened, and a hook having a side portion extending along and projecting downwardly from the rear edge of the lid mounting portion and a flange formed at the bottom edge of the side portion and extending toward the front face of the lid to securely engage the hook to the rear edge of the lid mount bracket, said hook having a plurality of recesses along the rear edge of the lid mounting portion indented toward the front face of the lid to increase rigidity of the hook.

* * * * *